US012662411B2

(12) United States Patent
Ostendarp

(10) Patent No.: US 12,662,411 B2
(45) Date of Patent: Jun. 23, 2026

(54) CUTTING METHOD AND CUTTING DEVICE FOR SCORING COMPONENTS MADE OF GLASS OR CERAMICS AND METHOD FOR DIVIDING COMPONENTS MADE OF GLASS OR CERAMICS

(71) Applicant: HEGLA GmbH & Co. KG, Beverungen (DE)

(72) Inventor: Heinrich Ostendarp, Haan (DE)

(73) Assignee: HEGLA GmbH & Co. KG, Beverungen (DE)

( * ) Notice: Subject to any disclaimer, the term of this patent is extended or adjusted under 35 U.S.C. 154(b) by 832 days.

(21) Appl. No.: 17/764,970

(22) PCT Filed: Sep. 23, 2020

(86) PCT No.: PCT/EP2020/076576
§ 371 (c)(1),
(2) Date: Mar. 29, 2022

(87) PCT Pub. No.: WO2021/063769
PCT Pub. Date: Apr. 8, 2021

(65) Prior Publication Data
US 2022/0411314 A1     Dec. 29, 2022

(30) Foreign Application Priority Data

Sep. 30, 2019     (DE) ........................ 102019215077.2

(51) Int. Cl.
C03B 33/07 (2006.01)
B28D 1/22 (2006.01)
(Continued)

(52) U.S. Cl.
CPC ............ C03B 33/078 (2013.01); B28D 1/225 (2013.01); B28D 7/005 (2013.01); C03B 33/037 (2013.01); C03B 33/107 (2013.01)

(58) Field of Classification Search
CPC ............................ C03B 33/105; C03B 33/107
See application file for complete search history.

(56) References Cited

U.S. PATENT DOCUMENTS 3,880,028 A * 4/1975 Frederick, Jr. ......... B23Q 15/12
                                                    83/522.25
5,038,654 A * 8/1991 Mackey ................... B26D 3/08
                                                    83/881
(Continued)

FOREIGN PATENT DOCUMENTS

DE          10157833 B4    10/2005
DE      102018217660 A1     4/2020
(Continued)

OTHER PUBLICATIONS

PCT Application No. PCT/EP2020/076576: International Search Report dated Apr. 5, 2022 (6 pages).
(Continued)

*Primary Examiner* — Boyer D Ashley
*Assistant Examiner* — Richard D Crosby, Jr.
(74) *Attorney, Agent, or Firm* — Dickinson Wright PLLC

(57) ABSTRACT

The present invention relates to a cutting method and a cutting device for the superficial scoring of, preferably plate-shaped, components made of glass or ceramics, preferably of glass sheets, and to a method for dividing of, preferably plate-shaped, components made of glass or ceramics, preferably of glass sheets, for example of float glass sheets or laminated glass sheets, in particular laminated safety glass sheets, into individual component cuttings, preferably glass sheet cuttings.

34 Claims, 14 Drawing Sheets

Figure 1:
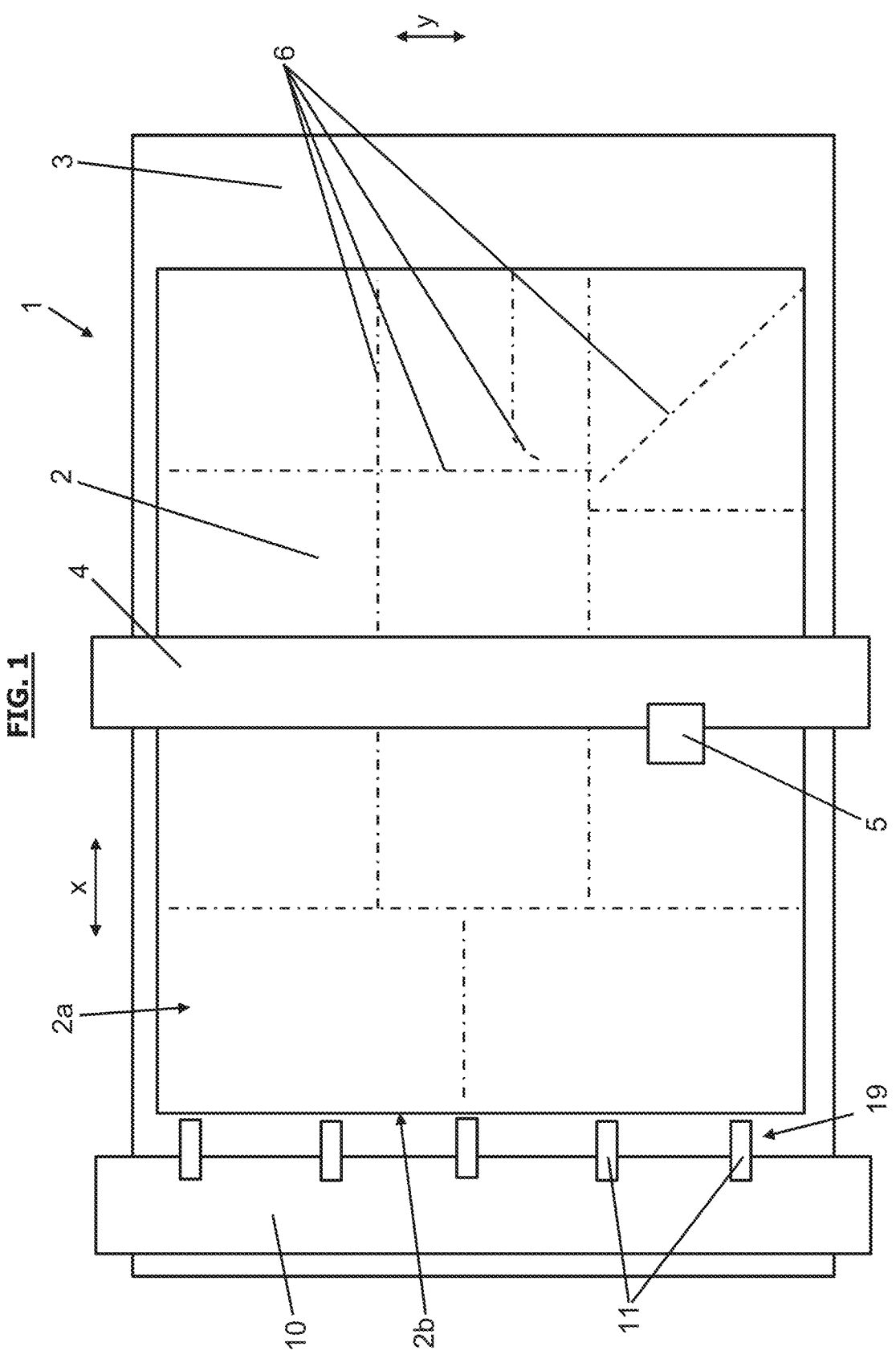

(51) Int. Cl.
   *B28D 7/00* (2006.01)
   *C03B 33/037* (2006.01)
   *C03B 33/10* (2006.01)

(56) References Cited

U.S. PATENT DOCUMENTS

| | | | | |
|---|---|---|---|---|
| 5,222,329 | A * | 6/1993 | Yu | B24B 49/003 |
| | | | | 451/10 |
| 5,515,758 | A * | 5/1996 | Bechmann | B26D 3/085 |
| | | | | 83/881 |
| 7,455,568 | B2 * | 11/2008 | Sekiya | B24C 7/0007 |
| | | | | 451/75 |
| 8,123,094 | B2 * | 2/2012 | John | C03B 33/0235 |
| | | | | 83/881 |
| 9,039,485 | B2 * | 5/2015 | Maurer | B23K 26/032 |
| | | | | 451/37 |
| 10,679,908 | B2 * | 6/2020 | Kayser | H01L 21/7806 |
| 2013/0291593 | A1 * | 11/2013 | Roh | C03B 33/037 |
| | | | | 65/158 |

FOREIGN PATENT DOCUMENTS

| | | | |
|---|---|---|---|
| JP | S63-297237 | A | 12/1988 |
| JP | H07257935 | A | 10/1995 |
| JP | 2002121039 | A | 4/2002 |
| JP | 2006035343 | A | 2/2006 |
| KR | 20160102317 | A | 8/2016 |

OTHER PUBLICATIONS

Chen, Xiaozhi et al., "Acoustic emission method for tool condition monitoring based on wavelet analysis," The Int. Journal of Advanced Manufacturing Technology (2007) 33 JG, S. pp. 968-976.

Bhuiyan, M.S.H. et al., "Application of acoustic emission sensor to investigate the frequency of tool wear and plastic deformation in tool condition monitoring," Measurement 92 (2016) pp. 208-217.

* cited by examiner

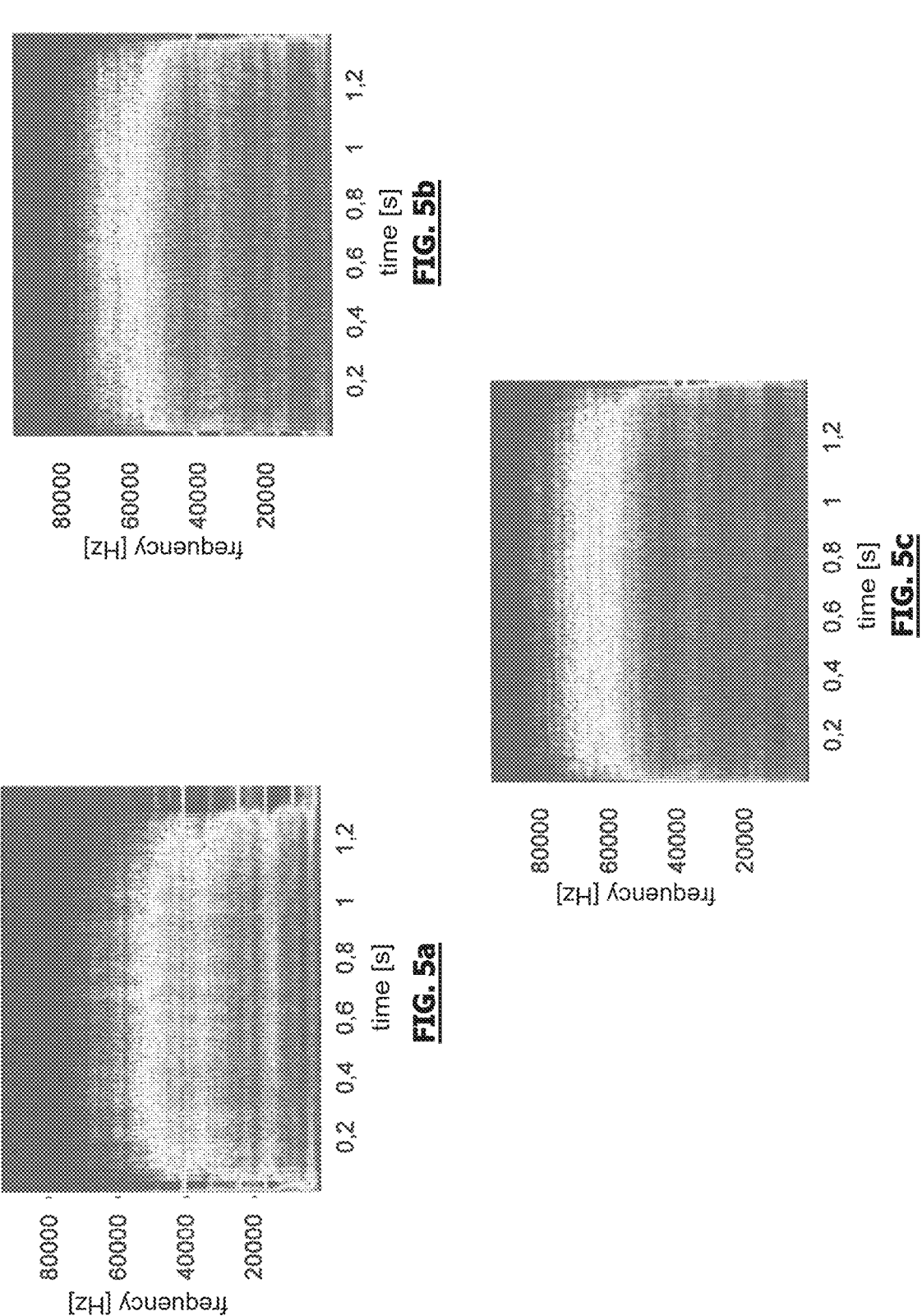

CUTTING METHOD AND CUTTING DEVICE FOR SCORING COMPONENTS MADE OF GLASS OR CERAMICS AND METHOD FOR DIVIDING COMPONENTS MADE OF GLASS OR CERAMICS

This application is a U.S. National Phase under 35 U.S.C. § 371 of International Application No. PCT/EP2020/076576, filed Sep. 23, 2020, which claims priority to German Patent Application No. 10 2019 215 077.2, filed Sep. 30, 2019.

The present invention relates to a cutting method and a cutting device for superficially scoring of, preferably plate-shaped, components made of glass or ceramics, preferably of glass sheets, and to a method for dividing of, preferably plate-shaped, components made of glass or ceramics, preferably of glass sheets, for example of float glass sheets or laminated glass sheets, in particular laminated safety glass sheets, into individual component cuttings, preferably into glass sheet cuttings.

Flat glass is any glass in the form of glass sheets, regardless of the manufacturing process used.

Laminated glass sheets are a laminate of at least two individual glass plates, which are respectively bonded together by means of an adhesive intermediate layer of plastic. In laminated safety glass, the intermediate layer for connecting the individual glass plates usually consists of an elastic, tear-resistant high-polymer film, so that if the sheets-break, the fragments adhere to the film. This reduces the risk of cut or puncture injuries. The laminated safety glass sheet also has a residual load-bearing capacity after breakage.

Flat glass sheets can consist of a single glass plate (single glass sheets) or of several glass plates bonded together (laminated glass sheets).

Dividing of single glass sheets is usually done by cutting or scoring the glass sheet to be divided superficially or on one of its two glass sheet surfaces with a cutting wheel and then breaking the glass sheet along or on the cutting line or scoring line or scoring track produced. Breaking is accomplished by bending the glass sheet, e.g., by bulging the glass sheet on both sides of the scoring line. The terms "cutting" and "scoring" are used synonymously in the art and also in the context of the present application for superficial scoring.

When dividing laminated glass sheets, both glass plates are first scored superficially, especially synchronously, and then the two glass plates are broken one after the other along the scoring line. Thus, both glass sheet surfaces of the laminated glass sheet are scored. After that the film arranged between the two glass plates is separated. This is done, for example, mechanically by means of a knife and/or thermally. However, separating of the film can also be accomplished beforehand by means of a laser.

DE 101 57 833 B4 discloses an apparatus for dividing a laminated glass sheet into individual laminated glass sheet cuttings, which comprises a support table for the laminated glass sheet, a cutting device with a scoring, breaking and separating tool for the division, and a positioning bridge arranged above the support table so as to be movable back and forth to the cutting device for displacing the laminated glass sheet on the support table. The positioning bridge has a gripping device with grippers for gripping the laminated glass sheet, which is configured in such a way that, relative to the counter-directional movement of the positioning bridge, the laminated glass sheet can be gripped both in its rear margin region facing away from the cutting device and in its front margin region facing the cutting device.

The aim when dividing glass sheets is in particular a good and, as far as possible, consistent quality of the breaking edges, especially for good edge strength. The breaking edges should be as smooth and even as possible, as well as perpendicular to the glass sheet surface, in order to have a better visual effect, to achieve higher manufacturing accuracy and/or to achieve the final dimension with less grinding removal during additional grinding processing. In particular in construction, the application limits of flat glass are significantly restricted by the edge strength. If the breaking edges are not of sufficient quality, extensive reworking is necessary, depending on the application, in order to improve the accuracy of fit and/or the edge strength.

During scoring, median cracks, radial cracks and lateral cracks are produced in the glass sheet. The simple breaking of the glass sheet is due to the intended strength-reducing effect of the median crack. However, the lateral and radial cracks should be avoided or reduced as far as possible because they reduce the edge strength. In particular, such microcracks in the breaking edge can still negatively affect the edge strength even after a subsequent grinding processing.

Depending on the application of the glass, the quality of the breaking edge can be evaluated with different weighting on the basis of the deviation from an exactly perpendicular and straight edge, on the basis of disruptive cracks or on the basis of the measured mechanical strength of the edge. In particular, the edge strength is determined as described in the article "Cut edge of annealed float glass: crack system and possibilities to increase the edge strength by adjusting the cutting process", Springer Nature Switzerland AG 2019, by TU Darmstadt. Also, the quality of the breaking edge can be assessed with the help of DIN 1249-11-2017-05.

Factors influencing poor edge quality include amongst others suboptimal machine technology, wrong choice of cutting tool, incorrect process parameters and/or the wear condition and/or damage of the cutting wheels.

Among other things, the correct cutting pressure is important for a consistently good quality of the breaking edge. If the cutting pressure is too high, for example, this leads to increased formation of undesirable lateral and radial cracks.

Also, an optimum and exact angle of the cutting edge of the cutting wheel in the contact area with the glass sheet surface is of decisive importance for good breakage quality. In addition, the cutting wheel must be rotationally symmetrical.

The cutting wheel is also subject to continuous wear in the area of contact with the glass sheet surface, which can be counteracted to a certain extent by changing process parameters. For example, the cutting edge of the cutting wheel becomes duller over time. Therefore, in order to still maintain a good quality of the breaking edge, the cutting pressure must be increased over time. This is initiated by the operator of a glass cutting system if he notices, for example on the basis of the visual appearance of the breaking edge, that the quality of the breaking edge is deteriorating.

Compared to these rather slow changes, however, sudden local damage of the contact area to the glass sheet surface is particularly critical, since it is often not immediately recognized and can lead to poorer qualities of the breaking edge.

Due to this, the scoring process and in particular the quality of the breaking edge must be continuously monitored and checked. It is known that experienced operators of a glass cutting system can sometimes judge the quality of the scoring process on the basis of the visual appearance of the scoring line and/or of the breaking edge during the scoring process and, if necessary, initiate appropriate countermeasures.

The object of the present invention is to provide a cutting method and a cutting device for cutting or scoring of, preferably plate-shaped, components made of glass or ceramics, preferably of glass sheets, which are to ensure a good quality of the breaking edge.

A further object is to provide a method for dividing glass sheets, which is also intended to ensure a good quality of the breaking edge.

The objects are solved by a cutting method according to claim 1, a cutting device according to claim 23 and a method according to claim 19. Advantageous further developments of the invention are characterized in the subsequent subclaims.

Figure 2:
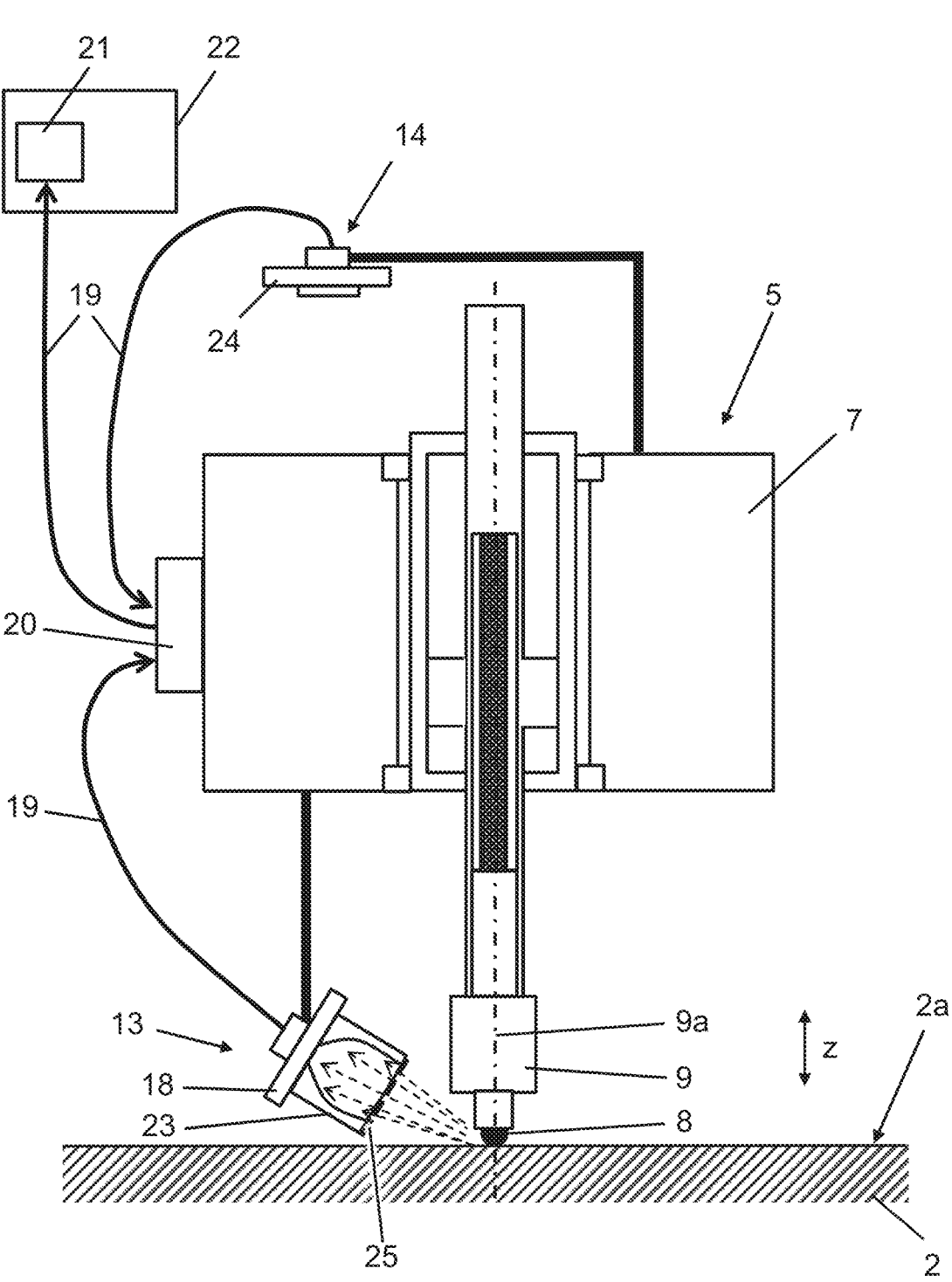
Figure 3:
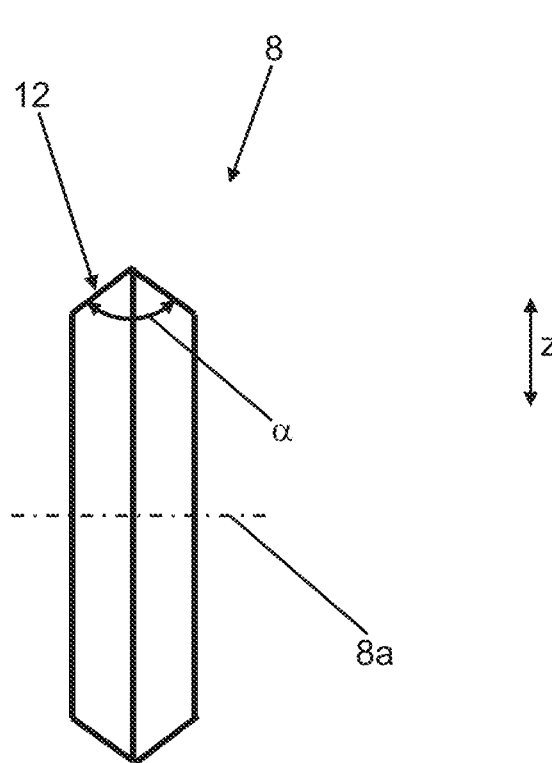

In the following, the invention is explained in more detail with the aid of a drawing by way of example. It shows:

FIG. 1: A greatly simplified and schematic top view of a cutting device according to the invention FIG. 2: A greatly simplified and schematic side view of a cutting head with a cutting wheel FIG. 3: A cutting side view of a cutting wheel FIG. 4: A frequency spectrum of a longitudinal section, cut with a microstructured cutting wheel FIGS. 5a-c: Frequency spectra of longitudinal sections, cut with conventional cutting wheels with different cutting pressures FIGS. 6a+b: Frequency spectra of a cross section and a longitudinal section, cut with the same conventional cutting wheel FIGS. 7a-c: Frequency spectra of conventional cutting wheels with different degrees of wear FIGS. 8a+b: The frequency spectrum of the conventional cutting wheel with average degree of wear from FIG. 7b and a deflection in the time signal, wherein in FIG. 8b the x-axis represents time(s) and the y-axis represent signal amplitude.

Figures 9A, 9B, 9C:
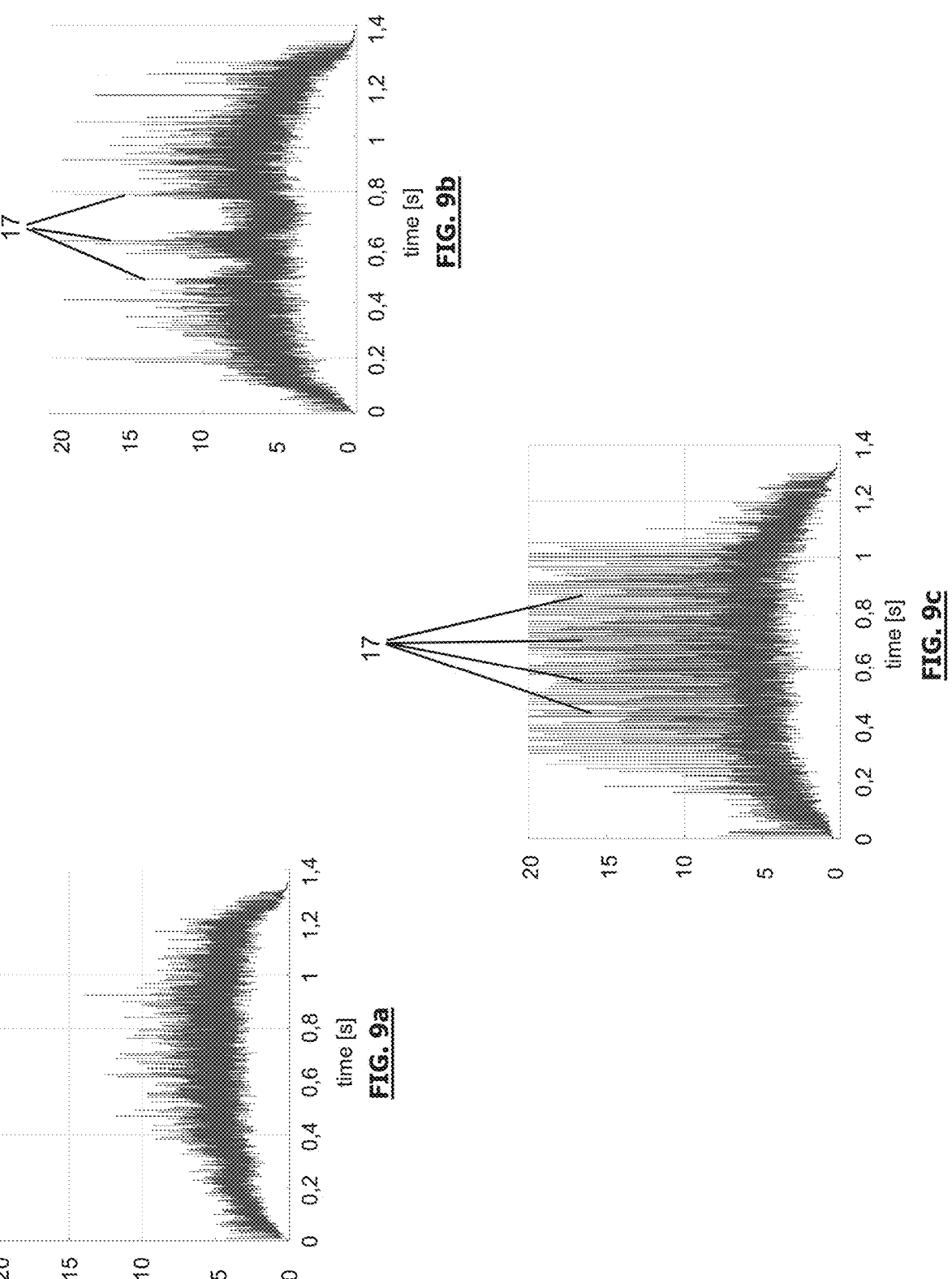

FIGS. 9a-c: Time-based evaluation of the time signals of the cutting wheels according to FIGS. 7a-c, wherein in FIGS. 9a-c the x-axis represents time(s) and the y-axis represents signal amplitude.

Figure 10:
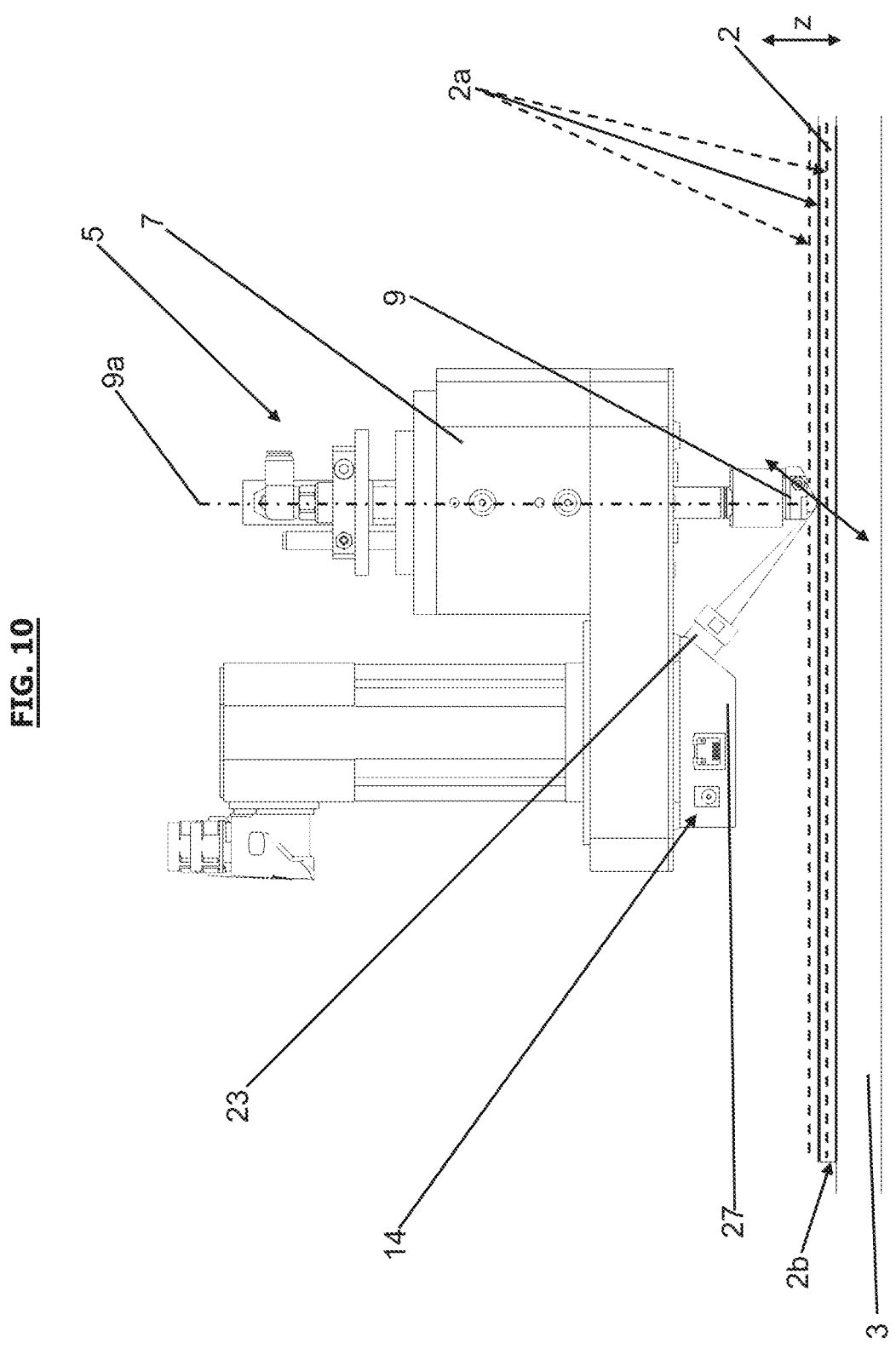

FIG. 10: A more detailed side view of a cutting head with a cutting wheel

Figure 11:
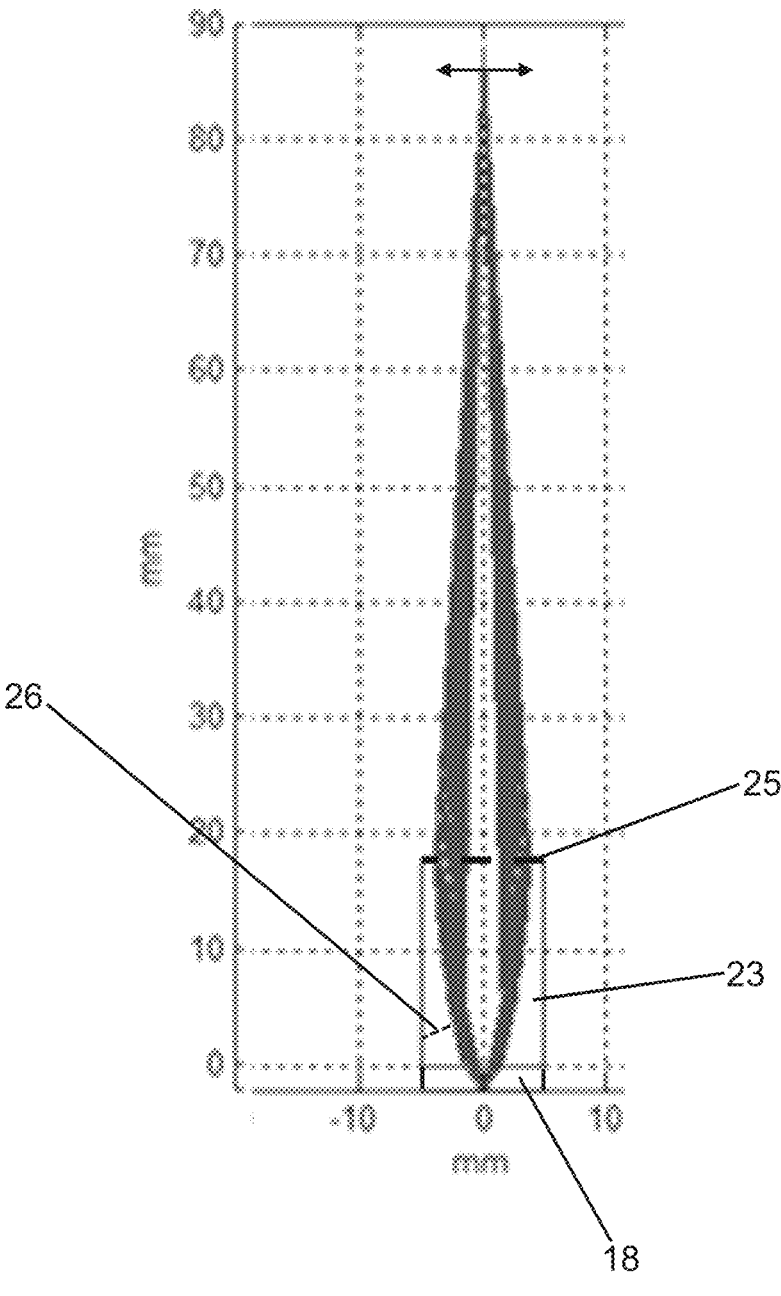

FIG. 11: A schematic illustration of a sound pressure sensor with sound funnel and with solid angle range of the sound picked up by the sound pressure sensor The cutting device 1 according to the invention (FIG. 1) is used for cutting glass sheets 2 and preferably also for dividing glass sheets 2, e.g. single glass sheets or laminated glass sheets, into individual glass sheet cuttings. For this purpose, the cutting device 1 has a support table 3 for receiving the glass sheet 2 to be cut and a cutting bridge 4 extending in a horizontal y-direction having a cutting head 5 for scoring a glass sheet surface 2a of the glass sheet 2 and for introducing scoring lines or scoring traces 6 into the glass sheet surface 2a. The cutting bridge 4 spans the support table 3 on the top and/or on the bottom. In addition, the cutting bridge 4 may be stationary or may be movable back and forth above the glass sheet 2 in a horizontal x-direction perpendicular to the y-direction. In this case, the cutting device 1 has corresponding drive means for moving the cutting bridge 4.

The cutting head 5 is mounted on the cutting bridge 4 movable back and forth in the y-direction in a manner known per se. The cutting bridge 4 has corresponding drive means for moving the cutting head 5.

In addition, also in a manner known per se, the cutting head 5 has a cutting head housing 7, a cutting wheel 8 and a cutting wheel carrier 9. The cutting wheel carrier 9 is mounted on the cutting head housing 7 movable back and forth in a vertical z-direction perpendicular to the glass sheet surface 2a. For this purpose, the cutting head 5 has corresponding drive means. In addition, the cutting wheel carrier 9 is preferably mounted on the cutting head housing 7 so as to be rotatable about a carrier rotation axis 9a parallel to the z-direction. The cutting wheel carrier 9 can be freely or driven rotatable about the carrier rotation axis 9a. The cutting wheel 8 is mounted on the cutting wheel carrier 9 so as to be freely rotatable about a horizontal wheel rotation axis 8a parallel to the glass sheet surface 2a.

In addition, the cutting device 1 preferably has at least one positioning bridge 10 for moving the glass sheet 2 in the x-direction on the support table 3. The positioning bridge 10 spans the support table 3 also on the top and/or bottom and has, for example, clamping grippers 11 for gripping the glass sheet 2 in the region of a glass sheet edge 2b and/or suction grippers for gripping the glass sheet 2 on the glass sheet surface 2a. In addition, the positioning bridge 10 is movable back and forth in the x-direction. For this purpose, the cutting device 1 has corresponding drive means. Of course, the cutting device 1 can also have other means for moving and/or gripping the glass sheet 2.

The cutting device 1 may also have means for rotating the glass sheet 2 about an axis of rotation parallel to the z-direction. The rotation can be performed, for example, by means of a suction gripper.

The cutting wheel 8 (FIG. 3) has a circumferential, V-shaped cutting edge 12 with a cutting angle $\alpha$. The cutting edge 12 can be sharpened in circumferential direction (conventional cutting wheels) or toothed (microstructured cutting wheels). These toothed or microstructured cutting wheels 8 (not shown) thus have a tooth structure on their cutting edge 12.

Basically, with the cutting device 1 any cutting contours, in particular also arcuate cutting contours, can be produced, by a combination of the movement of the cutting head 5 along the cutting bridge 4 in the y-direction, the movement of the glass sheet 2 in the x-direction and/or a movement of the cutting bridge 4 in the x-direction and/or a rotation of the cutting wheel carrier 9 about the carrier rotation axis in a manner known per se. However, mainly scoring lines 6 are generated which are parallel to the x-direction or parallel to the y-direction. A scoring line 6 parallel to the y-direction is generated by moving the cutting head 5 in y-direction along the cutting bridge 4 (=cross section). A scoring line 6 parallel to the x-direction is generated by moving the cutting bridge 4 and/or the glass sheet 2 in the x-direction (=longitudinal cut). During scoring, the cutting wheel 8 rolls along the glass sheet surface 2a in a manner known per se and scores or cuts into it.

Also, the glass sheet 2 can be rotated about an axis of rotation parallel to the z-direction during the scoring process to produce arcuate scoring lines.

In addition, the cutting device 1 preferably has means in a manner known per se for breaking the glass sheet 2 after scoring. For example, the cutting device 1 has a breaking roller which is also mounted on the cutting head 5. However, there may also be, for example, a breaking bar with holding-down devices. In this case, the cutting device 1 serves not only for cutting, but also for dividing glass sheets 2.

If the cutting device 1 is a laminated glass cutting device, it also has additional separating means for separating the laminated glass film. For example, this is a mechanical separating means, e.g. a separating knife. Alternatively or additionally, the separation can also be performed thermally. Also, it can be done by means of a laser. The separating can be done, for example, after breaking or already before by means of the laser. The laminated glass film can also be weakened by means of a laser before breaking.

In addition, the cutting bridge 4 in a laminated glass cutting device is designed as a double cutting bridge. The double cutting bridge has an upper and a lower cutting bridge part. The upper cutting bridge part spans the support table 3 on the top, the lower cutting bridge part spans the support table 3 at the bottom. A cutting head 5 is mounted on both the upper and lower cutting bridge parts. The two cutting heads 5 are mounted on the respective cutting bridge part so as to be movable in particular synchronously in the y-direction. In addition, the support table 3 is divided or slotted or has a gap or a slot extending in the y-direction in the area of the double cutting bridge in a manner known per se. The gap serves to accommodate the cutting and breaking and separating means.

Within the scope of the invention, it has now surprisingly been found that it is possible to monitor and improve the quality of the breaking edge if the scoring process is monitored or analyzed by means of acoustic emission analysis. This is preferably done online or in real time.

Acoustic Emission Analysis or Acoustic Emission Testing makes use of the fact that sudden changes in the structure of a material, triggered by chemical or thermal processes or under mechanical stress, lead to the emission of sound. On the basis of recording and analysis of these acoustic emission signals, the manufacturing quality or the damage state of material composites, components and parts can then be characterized, for example. Sensors, e.g. piezoelectric sensors, are used to detect the acoustic emission signals. These can convert the transient deflections in the material as the wave passes through it into a voltage signal, which can be digitized and further evaluated using software for data analysis.

However, acoustic emission analysis also has its limitations. For example, the presence of interference sources (e.g. machine noise, electromagnetic noise or crack border friction) is problematic.

In the present case, for example, there are very much mechanical joints in the interface chain—cutting wheel 8—wheel axle 8a—cutting wheel carrier 9—wheel carrier receptacle—cutting head 5, which dampen in particular high-frequency vibrations. The very small component size also hinders the attachment of a sensor system in the immediate vicinity of the cutting wheel 8. Also, high relevant frequency ranges are generated during the scoring process. For example, the rotational frequency of a cutting wheel 8 at a cutting speed of 1 m/s and a wheel diameter of 5.6 mm is 57 Hz. And the tooth meshing frequency for a microstructured cutting wheel with a tooth pitch of 50 μm and a cutting speed of 3 m/s is, for example, 60 kHz.

Nevertheless, within the scope of the invention, it was found that it is possible to monitor the scoring process or the quality of the scoring process, to detect and characterize certain disturbing phenomena by means of recording and analyzing the acoustic emission signals of a scoring process. In particular, it has been found that some cutting parameters, e.g. the cutting pressure and/or the wear condition of the cutting wheel 8 and/or the wear type of the cutting wheel 8 and/or the cutting speed can be monitored, adjusted, controlled and/or regulated by means of acoustic emission analysis.

For this purpose, the acoustic waves (=sound signals or acoustic emission signal) generated during the scoring process are detected by means of at least one AE sensor or sound pressure sensor or microphone 13 (FIG. 2), in particular a piezoelectric sensor, converted into electrical analog time signals, digitized and recorded. The sound pressure sensor 13 has a circuit board 18 in a manner known per se.

For digitization, the sound pressure sensor 13, in particular the circuit board 18, preferably has a digitization device, e.g. an analog-to-digital converter. Early digitization can reduce or avoid interference during signal transport.

Preferably, the sound pressure sensor 13 is connected to a further signal converter 20, in particular by means of cables 19. The signal recording takes place in an evaluation device 21. After the signal recording, a signal analysis takes place, preferably online, also by means of the evaluation device 21. The evaluation device 21 is preferably part of a control device 22 of the cutting device 1.

The signal analysis can take place in the time domain and/or in the frequency domain (frequency analyses).

In particular, as part of the signal analysis and evaluation, at least one actual cutting wheel signal is generated and compared with at least one previously determined or specified target characteristic of the cutting wheel signal. This can be done automatically by means of a software of the evaluation device 21 and/or also by an operator. The cutting wheel signal having the target characteristic and the corresponding actual cutting wheel signal can each be an electrical, analog or digital signal generated on the basis of the measured acoustic emission signals. For example, it can be an analog or digital time signal or a frequency spectrum.

The determination of the target characteristic of the cutting wheel signal is done, for example, on the basis of empirical values. For example, tables already exist in the technical field in which specific cutting wheel types with associated cutting parameters, such as cutting speed and/or cutting pressure, are specified for various glass sheets to be cut, which should be used/set for a good quality of the breaking edge. Scoring operations can then be carried out with these prespecified settings and the corresponding cutting wheel signal with target characteristics can be recorded. If the quality of the breaking edge is not sufficient despite the presettings, the cutting parameters must of course be adjusted accordingly to set the target characteristic of the cutting wheel signal. Characteristics of the recorded signals are thus correlated with the assessment of the edge quality.

The cutting wheel types differ, for example, in their type of sharpening and/or the cutting angle and/or the diameter, which will be discussed in more detail below. The different cutting wheel types each have a characteristic cutting wheel signal. For example, the cutting wheel signals differ from microstructured compared to non-structured cutting wheels. But also different non-microstructured cutting wheels have slightly different signal forms a priori.

In the course of signal analysis and evaluation, features are thus extracted and conclusions are drawn therefrom on the basis of collected data and experience. Methods of artificial intelligence, in particular of machine learning, can also be used here. For example, causal relationships and patterns can be recognized/derived on the basis of larger amounts of data. Predictions and conclusions can be calculated using a prediction algorithm.

For example, from collected data concerning the state of wear and/or the type of wear in correlation with the detected edge quality, conclusions can be drawn, and, for example, also limit values can be defined with regard to the target characteristic of the cutting wheel signal and predictions can be made with regard to the service life of the cutting wheel. In particular, it can be determined that the cutting wheel must be replaced from a specific degree of wear that correlates with a specific characteristic of the cutting wheel signal. And it can be monitored whether the cutting wheel is subject to a normal degree of wear. The target characteristic can thus also depend on the degree of wear and/or the type of wear.

If the signal analysis is based on frequency analyses, the recorded digital time signal is transformed into the frequency domain, preferably by means of a Fourier transform. The actual frequency spectra generated in this way are then further analyzed and evaluated, preferably compared with target characteristics. This can be done automatically by means of a software of the evaluation device and/or also by an operator. For example, as described above, a cutting wheel has a target characteristic of the frequency spectrum, which is then compared with the measured actual frequency spectrum. In particular, individual frequency ranges of the target characteristic and the actual frequency spectrum are compared with each other.

As is well known, Fourier transform is used to decompose continuous, aperiodic signals into a continuous frequency spectrum. Thus, a digital signal can be decomposed into its frequency components and then analyzed.

As already explained, the monitoring or acoustic emission analysis is preferably performed online.

According to the invention, acoustic emission signals at least, where applicable exclusively, in the inaudible ultrasonic range (16 kHz to 1.6 GHz) are recorded and/or analyzed. This is because it was found in the context of the invention that a more precise evaluation and monitoring of the scoring process is possible in this frequency range.

Furthermore, the sound pressure sensor 13 is arranged near the cutting wheel 8 and attached to the cutting head 5. This is shown schematically in FIG. 2. The sound pressure sensor 13 thus serves to detect near-emission acoustic signals or the near acoustic emission signals.

The sound pressure sensor 13 is further preferably directed towards the cutting wheel 8 (directional microphone). For this purpose, the sound pressure sensor 13 has a sound funnel 23. This can significantly reduce the detection of interfering noise and improve the measurement result. In particular, interfering noises from the environment, which are generated for example by the motion axes and drives, are suppressed and broadband cutting noises are possibly also amplified.

Surprisingly, it was found within the scope of the invention that, in particular due to the sound funnel 23, glass sheets 2 with different thicknesses can be cut without having to change the position of the sound pressure sensor 13 relative to the support table 3 in the z-direction. Because with glass sheets 2 of different thicknesses, the glass sheet surface 2a inevitably shifts in the z-direction relative to the sound pressure sensor 13 (see FIG. 10). This means that the sound source (the point at which the cutting wheel 8 is in contact with the glass sheet surface 2a) also shifts relative to the sound pressure sensor 13. The direction of the displacement is indicated as a double arrow in FIGS. 10 and 11. As a result, the sound source is no longer arranged exactly in the middle or centered with respect to the sound funnel 23 and the travel path of the individual acoustic waves is no longer the same. For example, the glass thickness of the glass sheets 2 to be cut is between 3 and 19 mm. This corresponds approximately to a displacement of 5.6 mm. Nevertheless, it was found in the context of the invention that the signal quality is still sufficiently good, since the travel paths change significantly less even with a displacement of 5.6 mm. Half the sound wavelength that could lead to local cancellation of the sound is at 90 kHz, for example, at 1.9 mm.

Furthermore, the sound pressure sensor 13 preferably has a protective membrane 25, which is arranged in front of or at the open end of the sound funnel 23. In particular, the protective membrane 25 covers the sound funnel 23 at its open end facing the cutting wheel 8.

The protective membrane 25 protects the sound funnel 23 from the intrusion of solid and liquid dirt particles, e.g. from the intrusion of cutting oil. Thus, they are in particular also as splash protection. The protective membrane 25 is thus on the one hand sound-permeable but on the other hand configured in such a way that the solid and liquid dirt particles cannot penetrate through it. Preferably, the protective membrane 25 consists of a fabric. Furthermore, the fabric preferably consists of metal, preferably stainless steel. In addition, the fabric preferably has a mesh size (=distance between the fabric threads) of 40 to 500 µm, preferably 55 to 100 µm. The protective membrane 25 should be as thin as possible in order to dampen the short sound waves as little as possible. Preferably, the fabric threads have a thread thickness (diameter) of 30 to 50 µm.

Alternatively, the fabric can also be made of plastic. However, since metal has lower damping than plastic, metal, especially stainless steel, is preferred.

Furthermore, the sound funnel 23 preferably has at least one ventilation opening 26 (schematically sketched in FIG. 11), which is also intended to prevent contamination of the sound pressure sensor 13. The ventilation opening 26 extends continuously from the outside to the inside through a funnel wall of the sound funnel 23. An airflow is generated by means of the ventilation opening 26 which provides for continuous cleaning or continuous exchange of the air within the sound funnel 23. As a result, dirt particles are continuously discharged from the interior of the sound funnel 23. It was found that despite the airflow, especially due to the high frequencies of the signals, the signal quality is not impaired.

In addition, in an advantageous further development of the invention, at least one further sound pressure sensor 14 can be provided for interference signal suppression, which is arranged further away from the cutting wheel 8 than the first sound pressure sensor 13. The further sound pressure sensor 14 thus serves for additional detection of remote acoustic emission signals. It detects a larger proportion of ambient noise or interference noise. For example, the interference noises are permanent or temporary background noises, e.g. in the hall in which the cutting device 1 according to the invention is arranged. Preferably, the further sound pressure sensor 14 is also arranged on the cutting head 5.

Preferably, the further sound pressure sensor 14 is also configured analogously to the first sound pressure sensor 13 and thus also has a circuit board 24, preferably with a digitizing device. However, it is preferably not configured as a directional microphone.

Preferably, the further sound pressure sensor 14 is also connected, in particular by means of cables 19, to the further signal converter 20 and via the latter to the evaluation device 21.

The length of the cables 19 is preferably 0.5 m each.

Preferably, the first and the further sound pressure sensor 13;14 as well as the signal converter 20 and the evaluation device 21 and the control device 22 are arranged in a housing 27 attached to the cutting head 5 (FIG. 10).

By means of the evaluation device 21, a signal analysis of the acoustic emission signals of the two sound pressure sensors 13;14 is then preferably carried out and the results are set off against each other. That is, the noise is calculated out of the near acoustic emission signals by means of noise suppression. The result is a characteristic cutting wheel signal calculated on the basis of at least two sound pressure sensors 13;14. The cutting wheel signal is in turn highly correlated with good or poor cutting behavior.

To reduce the computational effort, however, it is also possible, for example, to determine in an advantageous manner only on the basis of the remote acoustic emission signals whether the near acoustic emission signals are to be evaluated or not. If a limit value for noise detected on the basis of the analysis of the remote acoustic emission signals is exceeded, the near acoustic emission signals are not allowed for evaluation so that the noise signals are not evaluated as well, because this could otherwise lead to misinterpretations. In this case, the remote acoustic emission signals thus serve quasi as control signals.

For further optimization and improvement of the accuracy of the monitoring, it is also possible not to record and/or evaluate the acoustic emission signals during the entire cutting process. For example, only the acoustic emission signals are detected and/or evaluated that occur when noise sources are far away from the cutting wheel 8. This is the case, for example, with longitudinal cuts when the linear guides and drives are far away.

The advantages of the invention are explained in more detail below with reference to exemplary embodiments:

Within the scope of the embodiments, the acoustic emission signals of each one scoring process were detected, recorded and evaluated with two sound pressure sensors (near sound pressure sensor and remote sound pressure sensor). Both longitudinal and cross cuts were carried out. Longitudinal cuts were made by moving the cutting bridge in the x-direction. Cross cuts were made by moving the cutting head along the cutting bridge in the y-direction. A cutting device of the Rapidline type from the applicant was used.

For recording the near acoustic emission signals and the remote acoustic emission signals, identical microphones were used. In each case, the signals were already digitized directly on the circuit board on which the microphones were located. Both signals were combined in a converter box attached to the cutting head and transmitted in real time via a cable to the evaluation device. The near sound pressure sensor was located at a distance of about 60 mm diagonally in front of the cutting wheel and 40 mm above the glass sheet surface. In front of the near sound pressure sensor, an approximately 30 mm long metal turned part with a diameter of about 20 mm was positioned. This was machined on the inside and aligned in relation to the contact area between the cutting wheel and the glass sheet surface in such a way that the near emission acoustic signal occurring in the contact area between the cutting wheel and the glass sheet reached the near sound pressure sensor as far as possible in phase, thus producing a directional effect or amplification. The remote sound pressure sensor was positioned at a distance of about 200 mm spaced from the contact area between the cutting wheel and the glass sheet surface and above the cutting head, so that it mainly recorded the ambient noise. The remote sound pressure sensor was not equipped with a directional characteristic.

During signal evaluation, the two sensor signals were not offset in the sense of noise suppression. Rather, the signal evaluation of the near acoustic emission signals was dispensed with if noise exceeded a certain level.

The transformation of the digital time signals into the frequency domain for the frequency spectra shown in FIGS. 4 to 7 was performed in each case by means of online FFT (Fast Fourier Transformation). A window with a width of 2 ms was used, which was shifted in steps of 1 ms. The Hanning window was used as the window function. This resulted in a window width of 375 samples and a time resolution of 1 ms with an overlap of 50%. The frequency resolution was 501.3 Hz. Further, the signal recording was carried out at a sampling rate of 187.5 KHz. As it is known, frequencies can be resolved up to half of this frequency, i.e. 93.75 kHz, in this way (https://de.wikipedia.org/wiki/Ny-quist-Shannon-Abtasttheorem).

Figure 4:
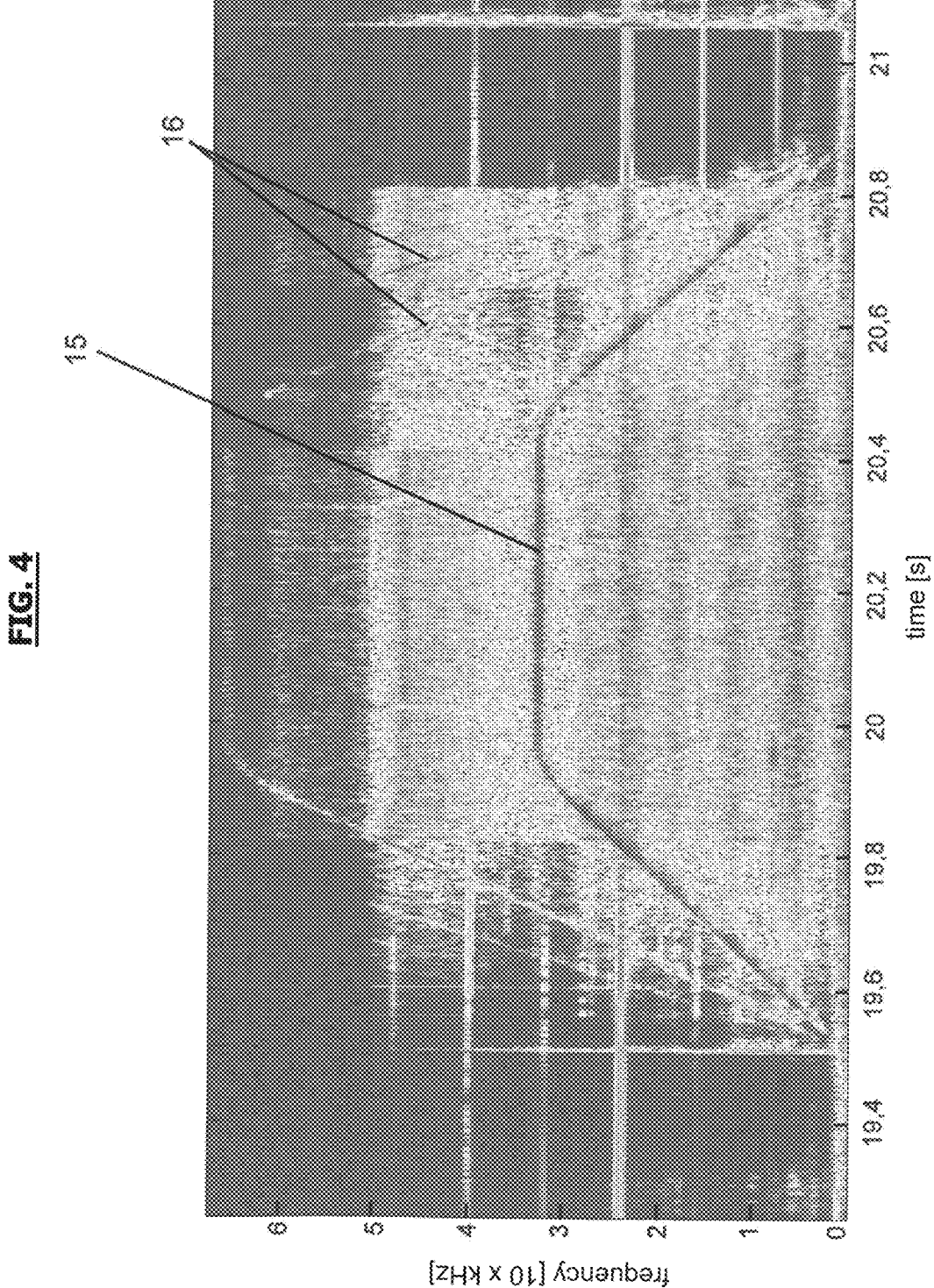

FIG. 4 shows a frequency spectrum of a longitudinal cut made with a microstructured cutting wheel. The acceleration of the cutting head was 4 m/s$^2$, the constant cutting speed was 100 m/min and deceleration was 6 m/s$^2$ with a tooth spacing of 50 μm on the cutting wheel.

FIG. 4 clearly shows the envelope curve 15, which initially rises during acceleration, then runs in a straight line at the constant cutting speed and falls again during deceleration. In addition, it can be seen that the envelope curve 15 has a wavy course. One period of the waves corresponds to one revolution of the cutting wheel. Harmonics 16 are plotted above the envelope curve 15.

From the waviness, the average tooth meshing frequency in the range of the constant cutting speed was determined to be 32.8 kHz. This corresponds to a constant cutting speed of 98.4 m/minute. The target tooth meshing frequency was 33.3 kHz (calculated from the target constant cutting speed/tooth distance). The slip was therefore 1.6%.

From the waviness, it was also possible to calculate that the tooth meshing frequency varies (32.3 kHz-33.3 kHz). This means that the cutting wheel appears to falter in some angular positions once per revolution, i.e. at approximately 94.9 Hz. The waviness thus indicates an asymmetry of the cutting wheel.

FIGS. 5a-c show frequency spectra of a longitudinal cut in each case. In each case, cutting was performed with a non-microstructured, conventional cutting wheel with a wheel diameter of 4.1 mm and a cutting angle of 145°. In addition, a single sheet of 4 mm glass thickness was cut. In doing so, the cutting parameter of cutting pressure was varied (FIG. 5a 0.3 bar, FIG. 5b 0.7 bar, FIG. 5c 1.1 bar).

The increase in cutting pressure can be clearly seen by way of a more pronounced high-frequency range. In particular, an increase in cutting pressure leads to a significant increase in broadband cutting noise over the entire frequency range up to 50 kHz.

Figure 6A:
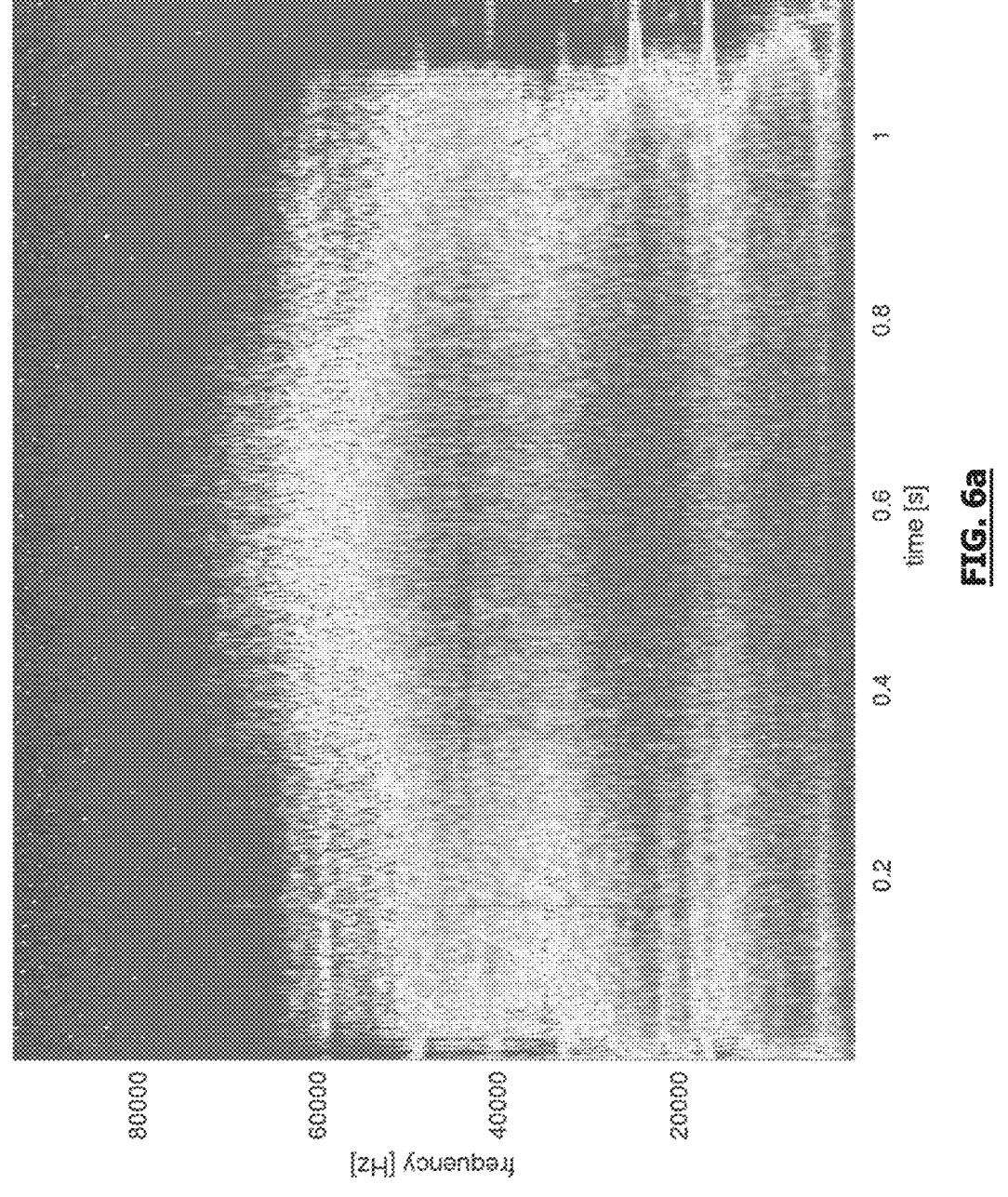
Figure 6B:
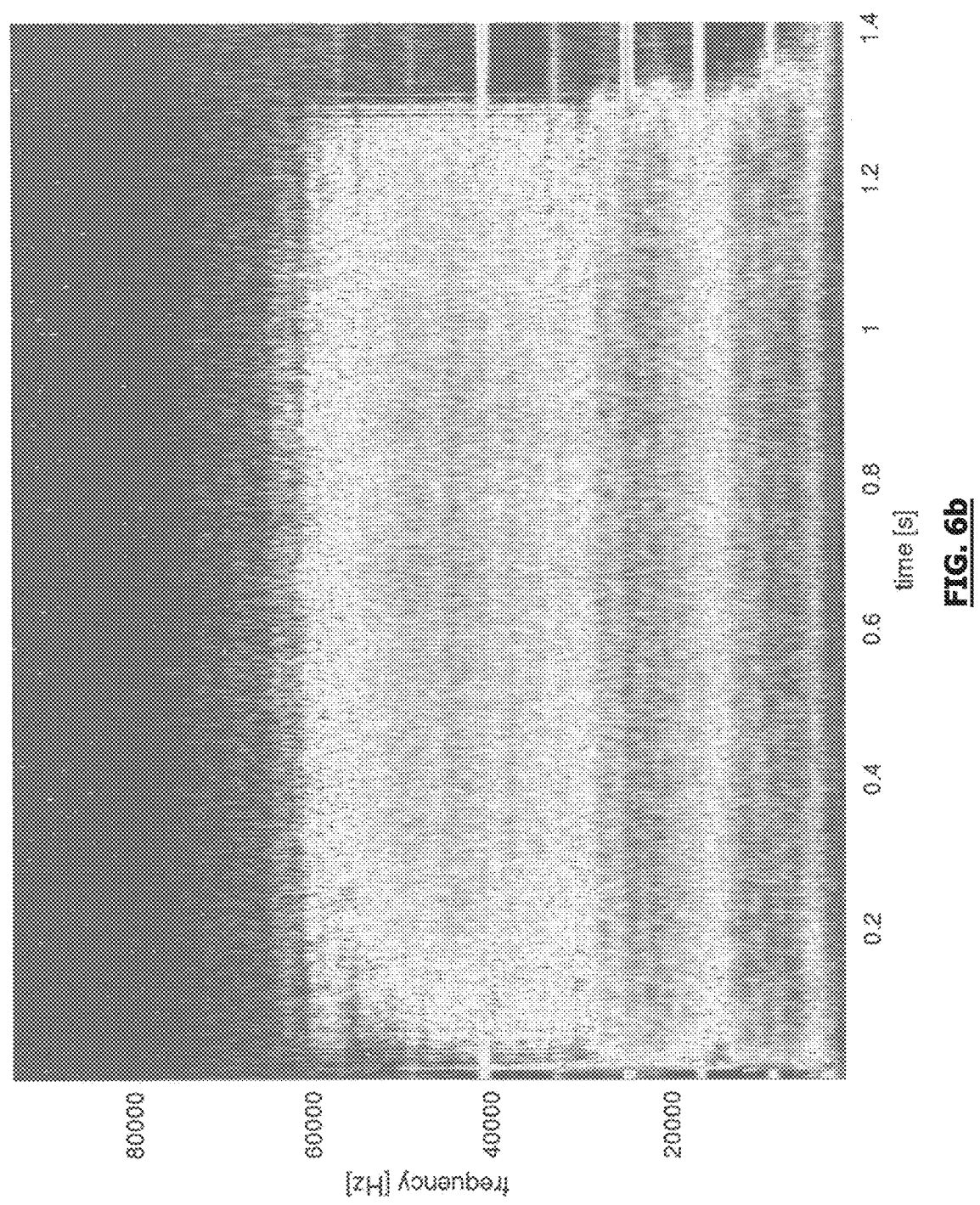

FIGS. 6a and 6b show the frequency spectra of a cross cut (FIG. 6a) and a longitudinal cut (FIG. 6b), each cut with the same non-microstructured cutting wheel.

It can be seen that the frequency spectrum of the longitudinal cut has less interference. This is because in the frequency spectrum of the cross cut, strong broadband noise can be seen in three frequency ranges. This is due to the fact that interference sources, especially linear guides, are further away in case of the longitudinal cut.

Figure 7A:
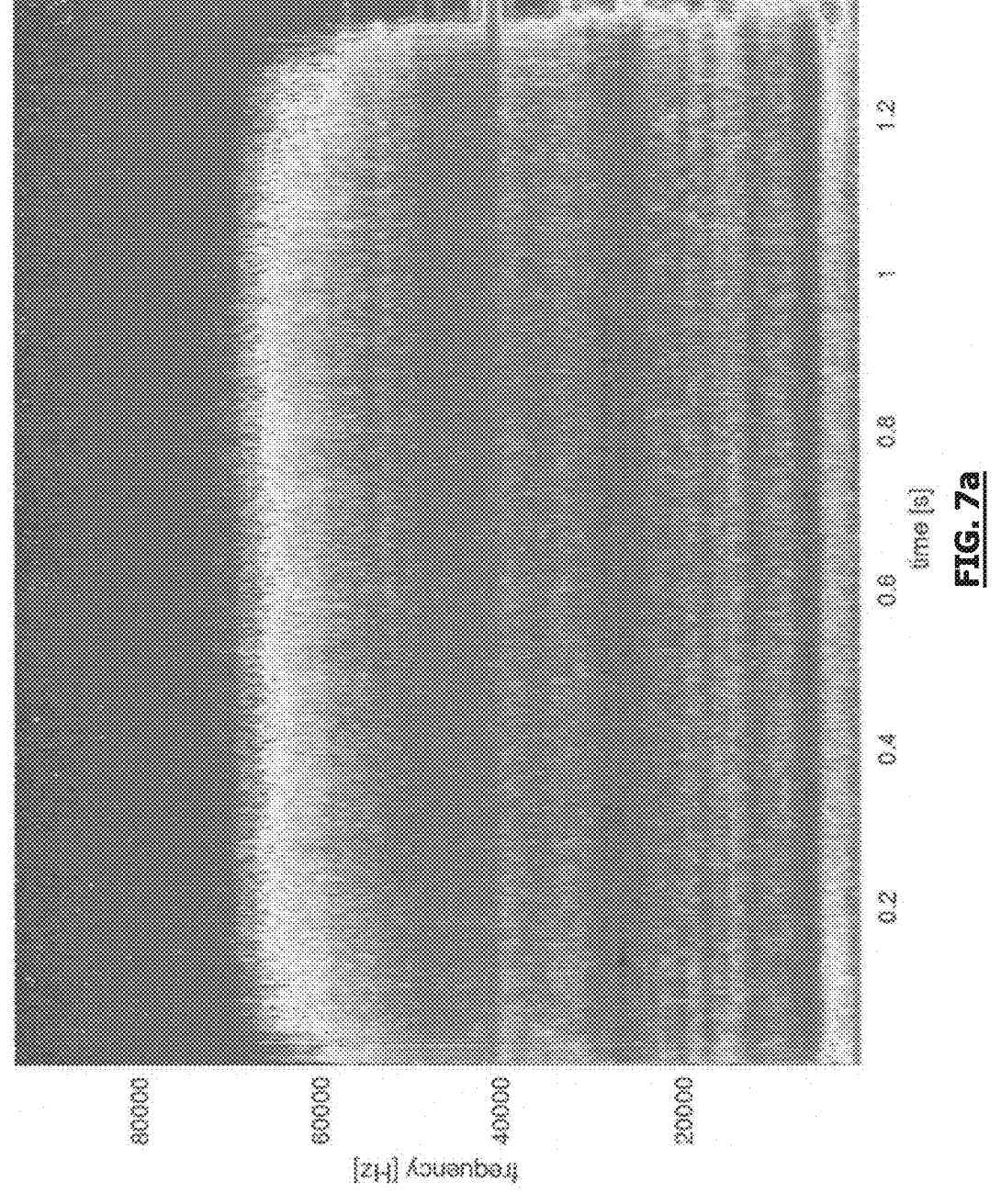
Figure 7B:
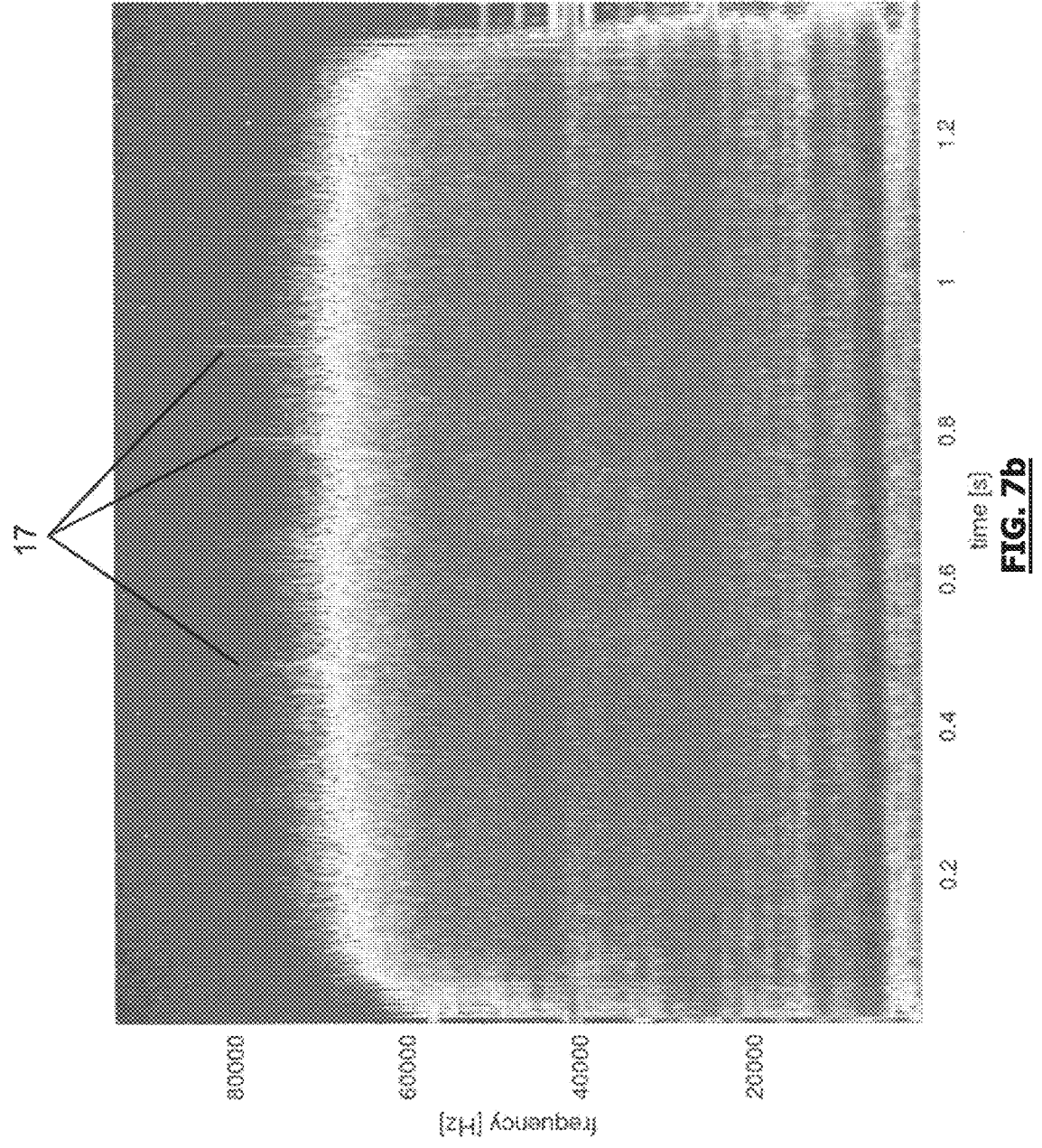
Figure 7C:
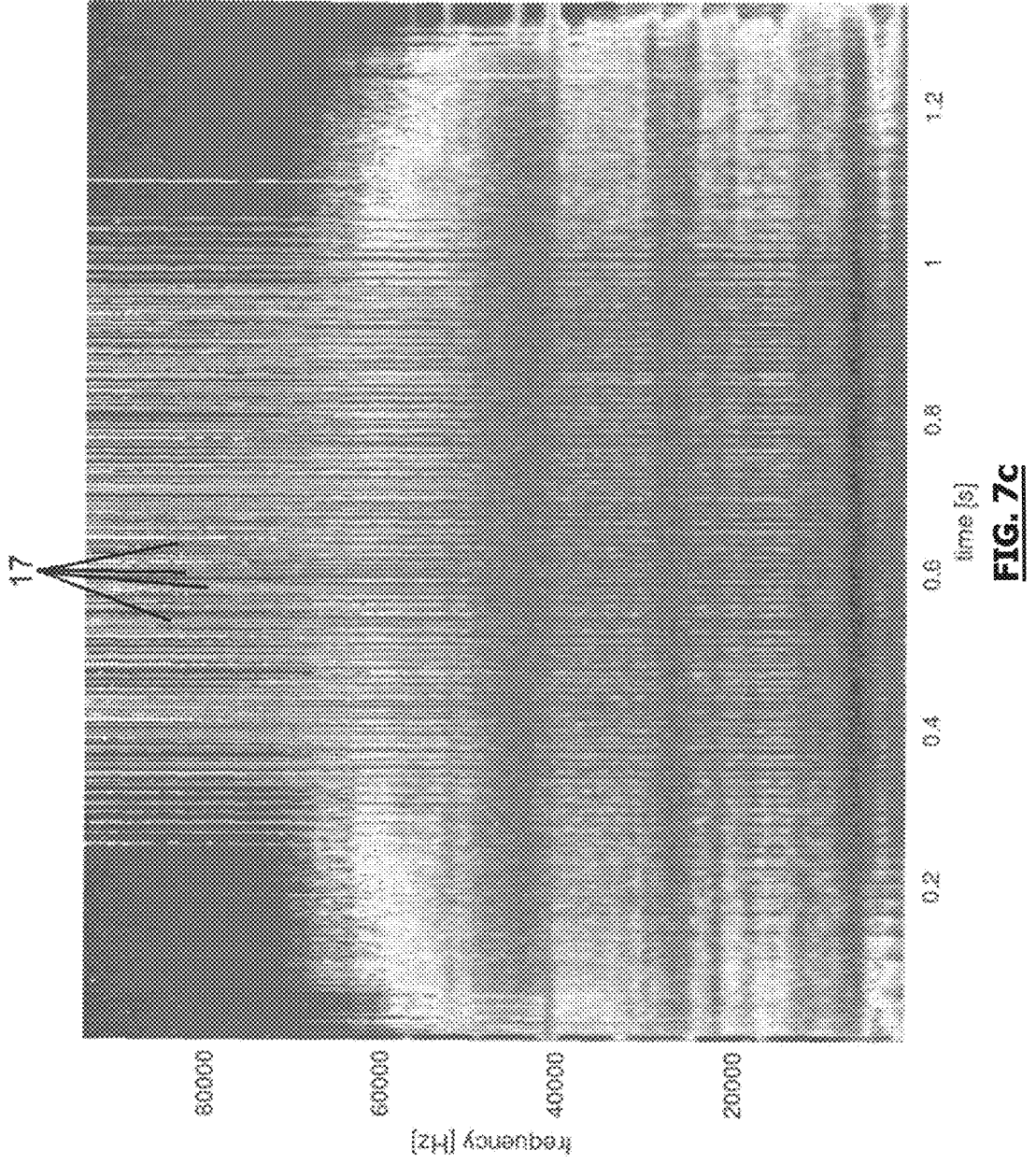

Furthermore, conventional cutting wheels with different wear states were tested in additional exemplary embodiments. The corresponding frequency spectra are shown in FIGS. 7a-c. FIG. 7a shows the frequency spectrum of a new cutting wheel. FIG. 7b shows the frequency spectrum of a cutting wheel with a medium degree of wear, and FIG. 7c shows the frequency spectrum of a worn cutting wheel with a notch.

It can be seen that the "events" or outliers become more frequent with increasing wear. These can be seen in the frequency spectra of FIGS. 7b and 7c by recurring peaks or outliers 17 in high frequency ranges. In FIG. 7c, the peaks or outliers 17 are again considerably increased and more frequent and, above all, more regular than in FIG. 7b. In the case of the cutting wheel in FIG. 7c, the time interval between two peaks 17 can also be read out. This corresponds approximately to the circumference of the cutting wheel of 17.6 mm. The cutting wheel obviously has a dominant defect which leads to a peak 17 once per revolution.

Wear can therefore not only be detected in principle, but different degrees and types of wear can also be distinguished.

In the case of the cutting wheels of FIGS. 7b and 7c, the cutting wheel of FIG. 7b could have remained in use in real operation, and cutting wheel of FIG. 7c would have had to be replaced beforehand to ensure a good quality of the breaking edge.

Figures 8A, 8B:
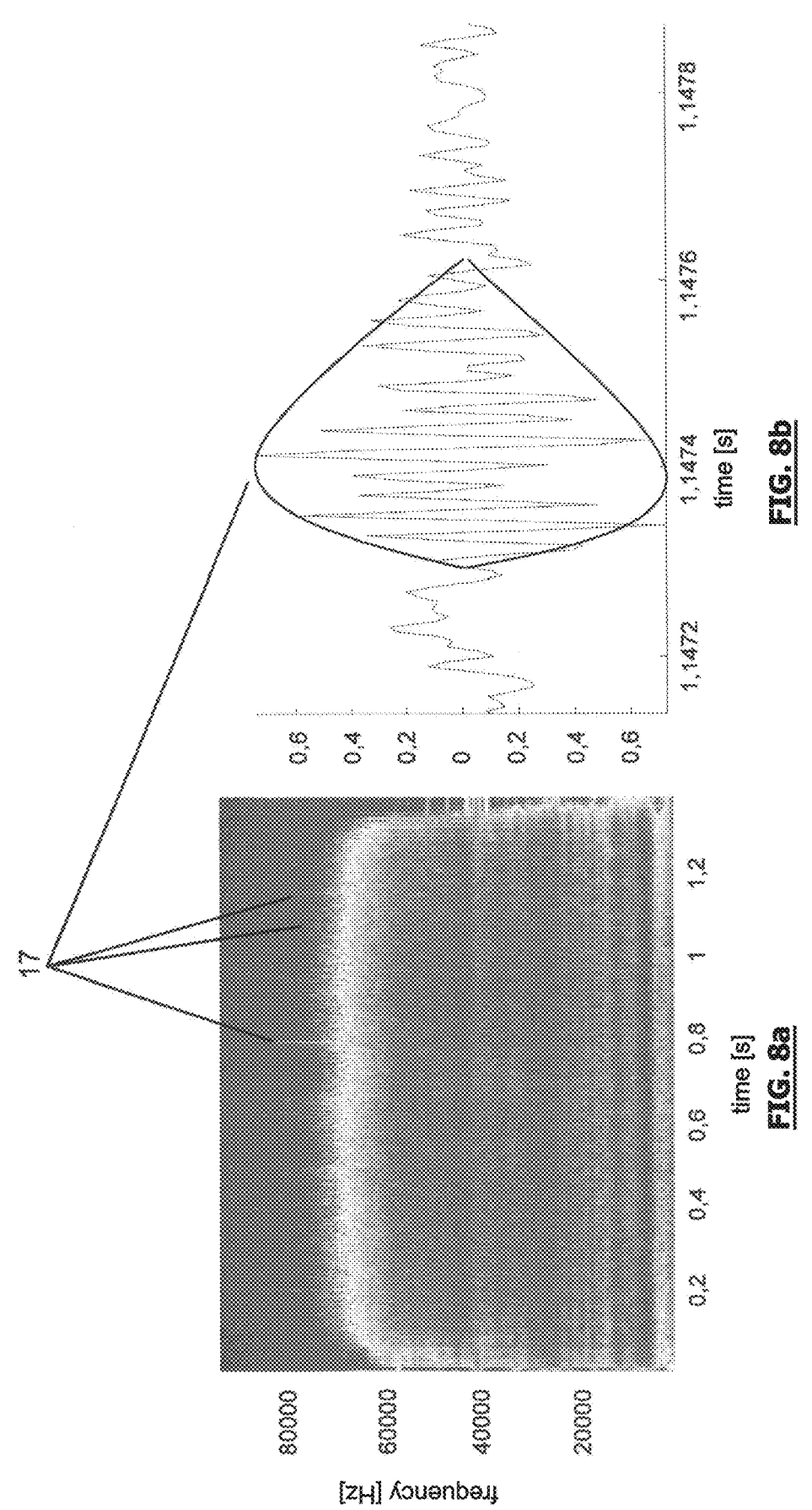

FIG. 8a again shows the frequency spectrum of the conventional cutting wheel with an average degree of wear. The cutting wheel had a wheel diameter of 5.6 mm and a cutting angle of 152°. FIG. 8b shows a peak 17 in the time signal. From FIG. 8b it is clear that the peaks are a true signal and not an artifact. It is a very broadband signal of about 0.2 ms duration.

FIG. 8b makes clear that the sampling frequency could ideally be even higher, because each peak is resolved by only one sample. For the signal analysis, as described above, every 1 ms, i.e. offset by 187.5 samples, 375 samples weighted by the Hanning window were subjected to a Fourier transform. In this way, a time resolution of 1 ms and a frequency resolution of 501.3 Hz are thus achieved in the frequency spectrum. With fewer samples in the Hanning window, the time resolution would be better at the cost of the frequency resolution.

In FIG. 4, for example, the stalling of the cutting wheel would then be resolved better in time, but worse in frequency range. At a typical cutting speed of 100 meters per minute and a cutting wheel diameter of 5.6 mm, the time for one revolution is 0.0105 seconds. If 375 samples are subjected to a frequency analysis at an interval of one millisecond, thus there are in average 10.5 frequency analyses per revolution of the cutting wheel.

FIG. 8b, however, also makes clear the limitation of the signal analysis over the frequency range. The event shown here has a time length of about 0.3 milliseconds, i.e. 56 samples at a sampling frequency of 187.5 KHz. With a width of the Hanning window of 375 samples, the time length of the "event" represents only a certain part. Periods of time without an "event" have therefore a larger weighting. In the time resolution, the "event" becomes clearer due to a smaller width of the Hanning window, which, however, is then at the cost of the frequency resolution.

FIGS. 9a-c show time signals of the cutting wheels according to FIGS. 7a-c. For the evaluation, the absolute value of the difference of the directly successive audio time signals was averaged with a moving average of 50 values. The result is a one-dimensional curve, which is easy to evaluate and which can additionally be easily evaluated using algorithms. The differences in the degree of wear can also be seen very well in this illustration. In particular, the peaks or outliers 17 are again clearly visible.

FIGS. 9a-c show advantages of a suitable signal analysis in the time domain. In addition to a probably lower required computing power, depending on the selected method, these lie in a better time resolution. This makes the very short-time "events" such as those in FIG. 8b stand out more clearly. The very simple algorithm used in FIGS. 9a-c requires little computing power.

The embodiments clearly show that the cutting method according to the invention and the cutting device according to the invention enable machine operators to be able to monitor and specifically adjust important parameters of the cutting device and/or of the cutting process, such as cutting speed and/or cutting pressure, and to detect the degree of wear and/or type of wear of the cutting wheel or machine faults.

This is because a clear influence of the cutting parameters on the time signal and/or frequency spectrum can be seen, which is similar across different cutting wheels. Or a change in the cutting parameters can be seen in the time signal and/or the frequency spectrum.

The analysis of the signals in the frequency domain (frequency analysis) is thus an alternative to the evaluation in the time domain. Depending on the application, for evaluation, signals are evaluated either in the time or frequency domain. Evaluation in the frequency domain is advantageous for conventional cutting wheels, for example, since the frequency spectrum is quite constant in time for cutting wheels that are not worn. In addition, an increase in cutting pressure causes higher frequency components to occur even with a new cutting wheel. With increasing wear, there are also more "events" that cause a short-term change in the frequency spectrum, especially such that higher-frequency frequency components increase. However, these can be seen even better in the time domain.

Furthermore, in the case of microstructured cutting wheels, frequency analysis can be used to infer the theoretical tooth meshing frequency based on the known tooth spacing and the known cutting speed. Because the actual frequency is slightly lower, this suggests slippage. If, at a constant cutting speed, a slight weaviness in the frequency response can be detected once per revolution of the cutting wheel, this suggests a slight stalling of the cutting wheel in certain angular positions.

Finally, in the context of signal analysis and evaluation, based on the physical understanding of the cutting processes and a-priori knowledge of, for example, the cutting wheel used and the specific process parameters (diameter, microstructured and if so how, cutting speed, . . . ), a characterization or classification of the recorded signals is carried out to determine whether the cutting parameters are set correctly, whether there are defects in the components and/or whether there is wear of the cutting wheel. For example, 1/revolution effects are detected which indicate defects in the components or a defect at one spot of the cutting edges.

Monitoring the scoring process is particularly advantageous for thin glass/display glass, but also for conventional glass thicknesses for high demands in automotive applications and large-area glass facades. In the display glass sector, only microstructured cutting wheels are used, except for smart phones (laser beam cutting).

Of course, it is also within the scope of the invention that the breaking and, in the case of a laminated glass sheet, the separating of the laminated glass film, do not take place in the cutting device, but in separate devices. In addition, breaking and separating can also be carried out manually.

In addition, the glass sheet can be divided in such a way that—depending on the cutting pattern—the entire glass sheet is first cut or scored and then broken and, if necessary, separated. Or a scoring line (in the case of laminated glass sheets on both glass sheet surfaces) is first created, subsequent to this the glass sheet is broken along the scoring line and, if necessary, it is separated. Then the separated glass sheets are scored again and divided. This can be done at will. The glass sheet can also be rotated on the support table to generate the next scoring line and/or separated glass sheets can be returned and then cut again. This is described, for example, in DE 10 2018 217 660.4 for laminated glass sheets.

Furthermore, as already explained, the cutting method according to the invention and/or the cutting device according to the invention can also be used to score other components made of glass or ceramic. And plate-shaped components can basically be divided into individual component cuttings in the same way as described for glass sheets.

In addition, it is within the scope of the invention to use a bowl-like sound reflector with a parabolic mirror or a sound tube to focus the sound onto the microphone point of the sound pressure sensor 13 instead of the sound funnel 23. The sound funnel 23 is preferred, however, since it ensures better signal quality, in particular for different glass thicknesses.

The invention claimed is:

1. A cutting method for the superficial scoring of a plate-shaped component made of glass or ceramic, wherein a scoring process introduces a scoring line by means of a cutting wheel into at least one component surface, wherein the scoring process is monitored by means of acoustic emission analysis, wherein in the context of the acoustic emission analysis, a signal analysis and evaluation of digitized acoustic emission time signals detected during the scoring process is carried out, the signal analysis and evaluation being carried out in the time domain and/or in the frequency domain, wherein during analyzing and evaluating the detected time signals, at least one actual cutting wheel signal curve is compared with a target cutting wheel signal curve having at least one target characteristic of the at least one actual cutting wheel signal curve, such that peaks or outliers are identified that signify wear of the cutting wheel or a reduction in edge quality of the scoring line.

2. The cutting method according to claim 1, comprising the acts of:

a) detecting acoustic emission signals from the cutting wheel during the scoring process using a sensor, b) converting and digitizing the acoustic emission signals into at least one electrical time signal, and recording the time signal, and c) analyzing and evaluating the time signal.

3. The cutting method according to claim 2, wherein the at least one electrical time signal is a voltage signal.

4. The cutting method according to claim 1, wherein the cutting wheel signal having the target characteristic and the corresponding actual cutting wheel signal are each an electrical, analog or digital time signal or a frequency spectrum generated on the basis of the measured acoustic emission signals.

5. The cutting method according to claim 1, wherein the time signal is transformed into at least one frequency spectrum during the signal analysis and the transformation is performed by means of Fourier transform.

6. The cutting method according to claim 1, wherein cutting parameters determined by means of the acoustic emission analysis selected from at least one of the cutting pressure, the degree of wear of the cutting wheel, the type of wear of the cutting wheel, the tooth meshing frequency of a microstructured cutting wheel, and the cutting speed are monitored.

7. The cutting method according to claim 1, wherein at least acoustic emission signals in the inaudible ultrasonic range from 16 kHz to 1.6 GHz are recorded and/or analyzed.

8. The cutting method according to claim 1, wherein the acoustic emission signals are detected when longitudinal cuts are made, which are generated by movement of a cutting bridge and/or the glass sheet and without movement of a cutting head along the cutting bridge.

9. The cutting method according to claim 1, wherein the acoustic emission signals of the cutting wheel are detected and analyzed during the scoring process.

10. The cutting method according to claim 9, wherein at least one first sound pressure sensor arranged in the vicinity of the cutting wheel is used for detecting near acoustic emission signals of the cutting wheel.

11. The cutting method according to claim 10, wherein the first sound pressure sensor directed towards the cutting wheel is used with a sound funnel or a sound reflector with parabolic mirror in order to focus the sound.

12. The cutting method according to claim 10, wherein the first sound pressure sensor is protected against contamination by cutting oil.

13. The cutting method according to claim 10, wherein at least one further sound pressure sensor is used for detecting remote acoustic emission signals, which is arranged further away from the cutting wheel than the first sound pressure sensor.

14. The cutting method according to claim 13, wherein the near acoustic emission signals and the remote acoustic emission signals are set off against each other in such a way that noise is calculated out of the near acoustic emission signals by means of noise suppression.

15. The cutting method according to claim 13, wherein based on the level of the noise detected by means of the remote acoustic emission signals, it is determined whether the near acoustic emission signals are to be evaluated or not.

16. The cutting method according to claim 1, wherein methods of artificial intelligence, in particular of machine learning, are used for the signal analysis and evaluation.

17. The cutting method according to claim 1, wherein the acoustic emission analysis is performed online or in real time.

18. A method for dividing of, preferably plate-shaped, components made of glass or ceramics, wherein the component is scored at least on one of its two component surfaces and then broken along the scoring line, wherein the scoring is carried out according to the cutting method according to claim 1.

19. The method according to claim 18, wherein by means of monitoring the scoring process, the breaking edge quality, in particular the breaking edge strength, of breaking edges of the divided components is monitored.

20. The method according to claim 18, wherein the target characteristic of the cutting wheel signal is determined by setting the cutting parameters as a function of a desired breaking edge quality, in particular a breaking edge strength.

21. The method according to claim 18, wherein the glass sheet is a laminated glass sheet consisting of two glass sheets joined together by a laminated glass film, wherein the laminated glass sheet is scored on both glass sheet surfaces, the two glass sheets are successively broken along the scoring line, and the laminated glass film is separated.

22. A cutting device for introducing scoring lines into at least one component surface of a plate-shaped component made of glass or ceramic, the cutting device configured to perform the cutting method according to claim 1, comprising:

a) a support table for receiving the component to be cut,
  b) a cutting bridge spanning the support table,
  c) at least one cutting head having a cutting wheel mounted to be movable back and forth along the cutting bridge in a y-direction,
  d) drive means for moving the cutting head along the cutting bridge,
    wherein the cutting device has means for monitoring the scoring process by means of acoustic emission analysis,
  wherein the cutting device further comprises a digitizing device for digitizing the acoustic emission signals, and an evaluation device configured for signal analysis and evaluation by comparing at least one actual cutting wheel signal curve to a target cutting wheel signal curve having at least one target characteristic of the at least one actual cutting wheel signal curve, such that peaks or outliers are identified that signify wear of the cutting wheel or a reduction in the edge quality of the scoring line.

23. The cutting device according to claim 22, wherein the cutting head comprises at least a first sound pressure sensor arranged in the vicinity of the cutting wheel for detecting near acoustic emission signals of the cutting wheel.

24. The cutting device according to claim 23, wherein the cutting device has means for protecting the first sound pressure sensor from contamination, in particular splash protection means for protecting the first sound pressure sensor from contamination by cutting oil.

25. The cutting device according to claim 23, wherein the first sound pressure sensor is directed towards the cutting wheel and preferably has means for focusing the sound, preferably a sound funnel, the first sound pressure sensor preferably having means for preventing dirt from entering the sound funnel.

26. The cutting device according to claim 25, wherein the sound pressure sensor has a sound-permeable protective membrane which covers the open end of the sound funnel facing the cutting wheel and serves to prevent dirt from entering the sound funnel.

27. The cutting device according to claim 26, wherein the protective membrane consists of a fabric which is preferably made of metal, preferably of stainless steel, or of plastic, and/or which preferably has a mesh size of 40 to 500 µm, particularly preferably 55 to 100 µm, and/or which has fabric threads with a thread thickness of 30 to 50 µm.

28. The cutting device according to claim 25, wherein the sound funnel has at least one ventilation opening which extends continuously from the outside to the inside through a funnel wall of the sound funnel.

29. The cutting device according to claim 23, wherein the cutting device has at least one further sound pressure sensor for detecting remote acoustic emission signals, which is arranged further away from the cutting wheel than the first sound pressure sensor, the further sound pressure sensor preferably being attached to the cutting head.

30. The cutting device according to claim 22, wherein the cutting bridge is stationary or can be moved back and forth over the component in a horizontal x-direction perpendicular to the y-direction.

31. The cutting device according to claim 22, wherein the cutting device has means for breaking the component along the scoring line.

32. The cutting device according to claim 22, wherein the cutting device serves for cutting laminated glass sheets and the cutting bridge is configured as a double cutting bridge which has an upper and a lower cutting bridge part, the upper cutting bridge part spanning the support table on the upper side and the lower cutting bridge part spanning the support table on the lower side, and a cutting head being mounted both on the upper and on the lower cutting bridge part.

33. The cutting device according to claim 32, wherein the cutting device has separating means for separating a laminated glass film.

34. The cutting method according to claim 1, wherein the plate-shaped component is a glass sheet.

* * * * *